(No Model.)
M. CLOSSET.
PROCESS OF PRESERVING MEAT.
No. 275,148. Patented Apr. 3, 1883.
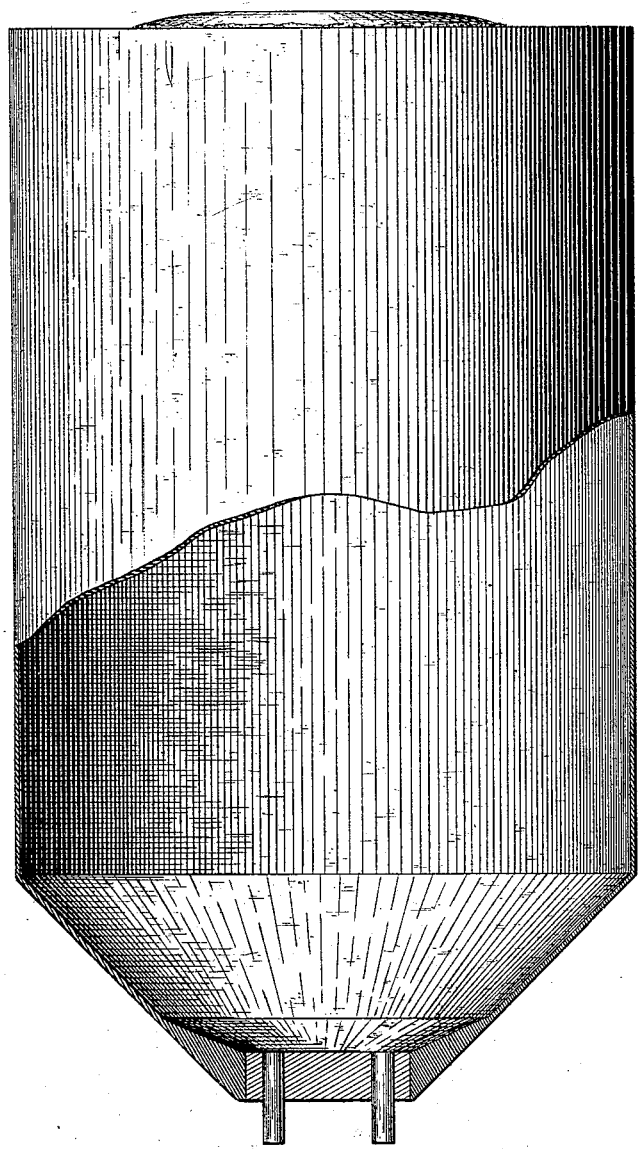
Attest.
Geo. T. Smallwood Jr.
H. E. Knight
Inventor.
Mathieu Closset.
By Knight Bros
attys

UNITED STATES PATENT OFFICE.

MATHIEU CLOSSET, OF LIEGE, BELGIUM.

PROCESS OF PRESERVING MEAT.

SPECIFICATION forming part of Letters Patent No. 275,148, dated April 3, 1883.

Application filed December 5, 1882. (No specimens.) Patented in Belgium November 7, 1882, No. 59,495.

*To all whom it may concern:*

Be it known that I, MATHIEU CLOSSET, a subject of the King of Belgium, residing at Liege, in the Kingdom of Belgium, have invented new and useful improvements in easy and inoffensive means of preventing indefinitely the alteration of fresh meat and organic tissues in general, of which the following is a specification.

The herein-described process has for its object to preserve fresh meat and organic tissues in general from all fermenting action by keeping them in hermetically-sealed cases in an atmosphere deprived of all substances which could produce or facilitate fermentation.

In order that the process may succeed perfectly, it is necessary to take certain precautions in the preparation of the meat. The animal must be skinned without "insufflation" and cut into pieces proportioned to the size of the cases to be used. These pieces are then wrapped in coarse cloth to prevent contact and immediately inclosed in hermetically-sealed cases. If considered necessary, when the meat is inclosed in the case a tube may put it in communication with the barrel of a small air-pump, in order to extract the air contained in the pores and surface vessels. The case is then placed with the tube at the top, and the case filled with an antiseptic liquid, such as alcohol, vinegar, a solution of borax in water, or any other chemical substance which is efficacious and inoffensive to health. Owing to the form of the receiver, all the air is expelled by the liquid, and when this fills the tube it is closed by means of a stopper or in any other appropriate manner. The case is then reversed and the tube plunged into a small vessel full of water. The stopper is then taken out, and, by means of an india-rubber or other tube, atmospheric air previously raised to a high temperature and deprived of its oxygen is passed in. Nitrogen or atmospheric air which has been calcined and carefully filtered, if considered necessary, might, for example, be employed. The liquid is thus gradually replaced by the air or a purified gas, and runs into a vat placed underneath the case. The stopper is replaced or the tube closed in any other manner, and the operation is finished. Meat thus packed is protected from nearly every chemical and physical agent which might decompose it. This process is based upon scientific principles and on experiment, and permits of the unlimited preservation of the most delicate organic tissues.

I am aware that it is not new to put water in a can of meat to drive out the air and then replace the water by hydrogen gas, and I do not claim that my process is broadly new, but limit myself to the continuous operation I describe.

Having thus described my invention, the following is what I claim as new therein and desire to secure by Letters Patent:

The method of preventing the alteration of fresh meats and other organic tissues, which consists in first entirely exhausting the air from the case containing the meat and substituting therefor an antiseptic liquid in such a manner as to disinfect the surfaces of the meat, followed immediately by the introduction of atmospheric air purified by fire, or nitrogen, which will replace the liquid, for the purpose of preserving the meat, &c., without the introduction of outside or deleterious agents.

In testimony whereof I have signed this specification in the presence of two subscribing witnesses.

M. CLOSSET.

Witnesses:
 VICTOR FANCOTTE,
 AD. ANCIAUX.